(12) United States Patent
Karmakar

(10) Patent No.: US 7,551,935 B2
(45) Date of Patent: *Jun. 23, 2009

(54) SMS+4D: SHORT MESSAGE SERVICE PLUS 4-DIMENSIONAL CONTEXT

(75) Inventor: Amit Karmakar, Palo Alto, CA (US)

(73) Assignee: U Owe Me, Inc., Palo Alto, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 11/519,600

(22) Filed: Sep. 11, 2006

(65) Prior Publication Data

US 2007/0066327 A1    Mar. 22, 2007

Related U.S. Application Data

(63) Continuation-in-part of application No. 11/231,575, filed on Sep. 21, 2005.

(51) Int. Cl.
H04W 4/00 (2006.01)

(52) U.S. Cl. .................. 455/466; 370/349; 370/328

(58) Field of Classification Search .................. 455/466
See application file for complete search history.

(56) References Cited

U.S. PATENT DOCUMENTS

| | | | |
|---|---|---|---|
| 4,959,785 A | 9/1990 | Yamamoto et al. | |
| 5,517,409 A | 5/1996 | Ozawa et al. | |
| 5,797,098 A | 8/1998 | Schroeder et al. | |
| 6,473,621 B1 | 10/2002 | Heie | |
| 6,560,456 B1 | 5/2003 | Lohtia et al. | |
| 6,731,940 B1 | 5/2004 | Nagendran | |
| 6,785,869 B1 * | 8/2004 | Berstis | 715/210 |
| 6,813,507 B1 * | 11/2004 | Gress et al. | 455/466 |
| 6,816,578 B1 * | 11/2004 | Kredo et al. | 379/88.17 |
| 6,963,839 B1 * | 11/2005 | Ostermann et al. | 704/260 |
| 6,964,020 B1 | 11/2005 | Lundy | |
| 6,966,035 B1 * | 11/2005 | Suess et al. | 715/753 |
| 6,993,553 B2 | 1/2006 | Kaneko et al. | |
| 7,177,902 B2 | 2/2007 | Hubbard | |
| 7,207,004 B1 * | 4/2007 | Harrity | 715/236 |
| 7,254,773 B2 * | 8/2007 | Bates et al. | 715/256 |
| 7,272,406 B2 | 9/2007 | Chava et al. | |

(Continued)

OTHER PUBLICATIONS

"About ContractBuddy"; http://www.contractbuddy.com/aboutCB/features.htm.

(Continued)

*Primary Examiner*—Lester Kincaid
*Assistant Examiner*—Diego Herrera
(74) *Attorney, Agent, or Firm*—Raj Abhyanker, LLP.

(57) ABSTRACT

A Short Message Service (SMS) enables a sender to send an asynchronous short text message from his source device to one or more receiving devices specified by the sender that represent one or more recipients. SMS+4D embeds, and allows the recipient to elicit contextual and explanatory information concerning the meaning of the short text message from the SMS, thus creating 'sideband' capability for text messages analogous to the visual and aural cues from accompanying facial and body expressiveness and the tone, timbre, pitch, and timing of a spoken message. SMS+4D may also learn, through embedded formal analysis and pattern comprehension, to associate specific contextual information to support the sender's original meaning, thereby clarifying surficially indefinite text words, phrases, or structures.

3 Claims, 2 Drawing Sheets

U.S. PATENT DOCUMENTS

Figure 1:
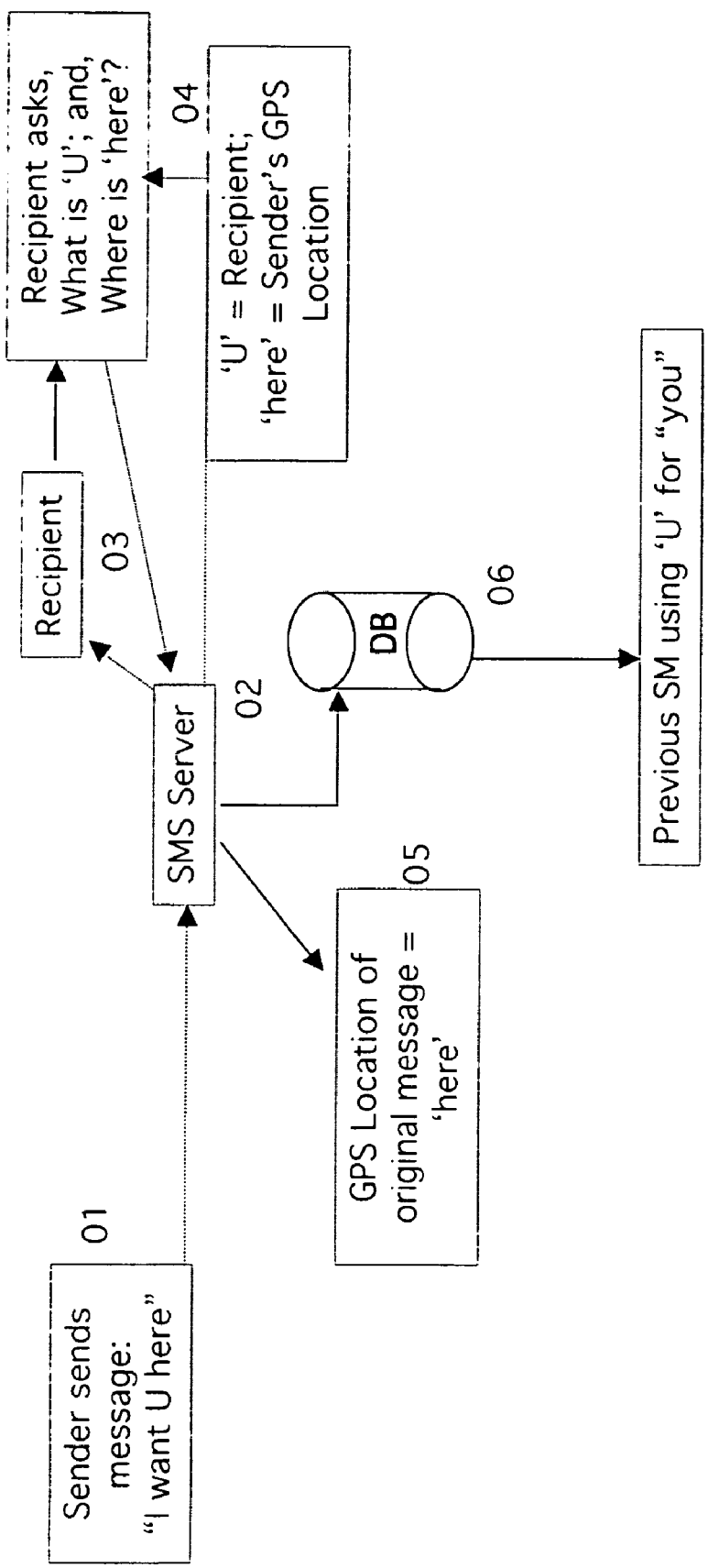

| | | | |
|---|---|---|---|
| 7,293,074 | B1 | 11/2007 | Jellinek et al. |
| 7,305,230 | B2 | 12/2007 | Zhigang |
| 7,315,902 | B2 | 1/2008 | Kirkland |
| 7,366,500 | B1* | 4/2008 | Yalovsky et al. .......... 455/414.1 |
| 7,424,682 | B1* | 9/2008 | Pupius et al. ............... 715/758 |
| 2002/0077135 | A1 | 6/2002 | Hyon |
| 2002/0173294 | A1 | 11/2002 | Nemeth et al. |
| 2002/0187794 | A1 | 12/2002 | Fostick et al. |
| 2002/0193996 | A1* | 12/2002 | Squibbs et al. .............. 704/260 |
| 2002/0198715 | A1* | 12/2002 | Belrose ...................... 704/266 |
| 2003/0023424 | A1* | 1/2003 | Weiner ........................... 704/8 |
| 2003/0078033 | A1 | 4/2003 | Sauer et al. |
| 2003/0085989 | A1 | 5/2003 | Tay |
| 2003/0125927 | A1 | 7/2003 | Seme |
| 2003/0144895 | A1 | 7/2003 | Aksu et al. |
| 2003/0186716 | A1 | 10/2003 | Dorenbosch et al. |
| 2003/0207701 | A1 | 11/2003 | Rolnik et al. |
| 2003/0236658 | A1* | 12/2003 | Yam ............................... 704/2 |
| 2004/0024683 | A1 | 2/2004 | Morcinicc et al. |
| 2004/0034561 | A1 | 2/2004 | Smith |
| 2004/0044517 | A1* | 3/2004 | Palmquist ...................... 704/7 |
| 2004/0102201 | A1 | 5/2004 | Levin |
| 2004/0102956 | A1 | 5/2004 | Levin |
| 2004/0110493 | A1 | 6/2004 | Alvarez et al. |
| 2004/0122979 | A1* | 6/2004 | Kirkland .................... 709/247 |
| 2004/0158471 | A1 | 8/2004 | Davis et al. |
| 2004/0179545 | A1 | 9/2004 | Erola et al. |
| 2004/0194141 | A1 | 9/2004 | Sanders |
| 2004/0215526 | A1 | 10/2004 | Luo et al. |
| 2004/0221256 | A1* | 11/2004 | Martin et al. ............... 717/101 |
| 2004/0221260 | A1* | 11/2004 | Martin et al. ............... 717/104 |
| 2004/0235503 | A1 | 11/2004 | Koponen et al. |
| 2004/0248591 | A1 | 12/2004 | Fish |
| 2004/0266462 | A1 | 12/2004 | Chava et al. |
| 2005/0003837 | A1 | 1/2005 | Midkiff et al. |
| 2005/0004840 | A1 | 1/2005 | Wanninger |
| 2005/0027608 | A1 | 2/2005 | Wiesmuller et al. |
| 2005/0038892 | A1 | 2/2005 | Huang et al. |
| 2005/0066044 | A1 | 3/2005 | Chaskar et al. |
| 2005/0128967 | A1 | 6/2005 | Scobbie |
| 2005/0171944 | A1* | 8/2005 | Palmquist ...................... 707/4 |
| 2005/0191963 | A1 | 9/2005 | Hymes |
| 2005/0198304 | A1 | 9/2005 | Oliver et al. |
| 2006/0135181 | A1 | 6/2006 | Dale et al. |
| 2006/0167992 | A1 | 7/2006 | Cheung et al. |
| 2007/0027673 | A1 | 2/2007 | Moberg |
| 2007/0076877 | A1 | 4/2007 | Camp et al. |
| 2007/0208813 | A1* | 9/2007 | Blagsvedt et al. ........... 709/206 |
| 2008/0059152 | A1* | 3/2008 | Fridman et al. ................ 704/9 |
| 2008/0133228 | A1* | 6/2008 | Rao ........................... 704/231 |

OTHER PUBLICATIONS

"Electronic negotiations, media, and transactions in socioeconomic interactions"; Yuan; http://interneg.org/enegotiation/resources/online_info.html.

"Distributed PeCo-Mediator: Finding Partners via Personal Connections" Ogata et al.

1996 IEEE Int'l Conf. on Systems, Man, and Cybernetics; Information Intelligence and Systems; vol. 1, p. 802-807.

"What Can Computer Programs Do To Facilitate Negotiation Processes?"; Chaudhury, et al.; 1991 ACM 0-89791-456-2/91/0010/0269.

"Speech Centric Multimodal Interfaces for Mobile Communication Systems"; Kvale et al.; Telektronikk Feb. 2003; p. 104-117.

"Dumas—Adaptation and Robust Information Processing for Mobile Speech Interfaces"; Jokinen et al.

"Google SMS: How to Use"; http://www.google.com/sms/howtouse.html.

* cited by examiner

SMS+4D: SHORT MESSAGE SERVICE PLUS 4-DIMENSIONAL CONTEXT

CROSS REFERENCE TO RELATED APPLICATIONS

This is a continuation in part of patent application Ser. No. 11/231,575, filed on Sep. 21, 2005. This continuation-in-part application is filed to continue the prosecution, separately, of the invention below, and expressly incorporates both below and by reference all of the original application's specification and drawings.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

1.A. Field of the Invention

This invention is in the field of Short Message Services, and more specifically, the field of implementations devised to provide, for their users, supportive interpretations of short messages whose sparse formal substance may be inadequate to communicate to the recipient what the sender intended. This invention makes no claim for physical transmission, storage, or reproduction machinery or mechanisms used to handle a Short Message (SM; in the plural, SMs), presuming the existence and availability of such physical means as well-established in the prior art, whether such be a Morse telegraph or a Blackberry wireless text message and pager.

1.B. Description of the Related Art

The prior art, as described in the original application Ser. No. 11/231,575, "SMS+:Short Message Service Plus Context Support for Social Obligations", filed on Sep. 21, 2005, described a new method for supporting short, less-than-formally complete text messages to communicate between a sender and one or more recipients. For the reasons and advantages listed in the prior application and below, inventor created the invention described therein. The prior art references, definitions, and description of the parent application are hereby specifically incorporated into this continuation-in-part.

Since the parent application was filed, further enhancements and improvements have been created by the inventor in response to problems and concerns that have been discovered during commercial implementations of the prior invention. A chief problem with the original application's invention for some SMS users, was that some text message often required repeated exchanges to clarify formally-indefinite words. Anyone involved with patent drafting knows that problems can arise with antecedents when context or grammatical reasoning is depended upon to provide a non-explicit linkage to the source noun. With text messages, where substitutions often are used (e.g. the letter "U" for the pronoun "You"; the letter combination "2C" for the infinitive "to see"), understanding a message's meaning may require one, two, or several layers of interpretation. That has slowed, and continues to handicap, the spreading usage of SMS text-messaging to the external development of shared common knowledge. (Contrary to appearances, new slang does not spontaneously generate simultaneously in each generation of teenagers, but requires transmission of either the definition, or the underlying shared experience, first.)

This limitation on the realization of a shared 'network effect' is a known problem within any computing or communication application; and its solution depends upon a meta-level response—some means for communicating the definition of any implicit or coding linkage must be used above and beyond the use of such a coding linkage in a message transmitted between a sender and a recipient.

A second problem was that the original application's invention encountered confusion and clashes arising out of the disparate expectations and practices of the SMS+ developers and users as to the language certainty and standard definitions for SMS text phrases.

A third problem lay in the disparity between the paucity of SMS text and the quickly-increasing richness of communications bandwidth.

The applicant soon realized that it would be wise to devise a more complex integration between human-user informalities and the external linkages providing context for the SMS+ 4D service which might lead to speedier and broader adoption and adaptation.

Short Message Services (SMS) are a way to send a message to a subscriber's wireless phone or other device. SMS messages have become quite popular recently. The messaging source typically is a cellphone or other hand-held device capable of supplying a user-input message. While previous generations of hardware limited the total bandwidth and number of messages due to memory costs, these are constantly dropping. However, the usual limitation on formally controlled input means still remains; most hand-held devices offer a limited-count keypad, the most common such appearing in a 3×4, digital-telephone keypad format.

At the same time, less-formally controlled input means are being added, with the most common pair being some form of on-device visual image capture means (the cellphone 'camera', implemented often with CCDs) or a short-range wireless linkage means (usually described by the wireless protocol and standard used, e.g. 'Bluetooth'). These provide the potential for an information 'sideband' that can be used to help provide the context for a text message.

In addition now to the previous generation of character-only, text messages that are allowed by most Short Message Service providers, context-providing information (visual or radio) can be associated with a specific text message. Furthermore, the SMS provider can use the text message, the associated context-providing sideband information, or an existing pattern of either or both of the above, to infer and associate context correctly, such that a recipient asking for clarification may receive that automatically from the SMS provider rather than having to play 'telephone tag' with the original sender.

The real strength of synchronous communications is not that they are more perfect than asynchronous ones. In fact, generally the opposite is true; asynchronous communications are by custom and good sense far more formal than their synchronous counterparts. For the strength of synchronous communications is that they incorporate an immediate opportunity for identification of a miscommunication arising from indefiniteness or non-shared context. Recognition of the failure can be signaled with an overt error message (e. g. "What do you mean by 'this'?"); or it can be communicated through the visual or aural sideband signals (e.g. a puzzled expression, pointing to each of the possible selections in series with raised eyebrows, or a baffled tone of voice). However, synchronous communications require that both parties must remain attentive to each other throughout the entire process.

The parent invention noted that informality and combined contextual and cultural knowledge could be used to overcome many of these concerns for SMS text messages. The present invention goes further, and addresses the potential of pattern-recognition and interpolation techniques and of associating the main text message with any provided secondary or contextual cues.

SUMMARY OF THE INVENTION

A Short Message Service Plus 4-Dimensional Context allows a sender to send an asynchronous and informal text message from his originating source device to one or more receiving devices specified by the sender, which represent one or more recipients. The SMS may associate and attach additional signal information, either upon original transmission or upon a request for clarification from the text message's recipient(s).

One step of the invention is identifying whether terms in the text message are definite, whether the text message provides unambiguous linkage between its elements, and whether sideband information is being provided that should be used to properly associate any indefinite terms with the real world as perceived by the sender of the message, so that if the recipient requires removal of any ambiguity, the SMS can minimize the need for the sender to be involved in the clarification.

The SMS may, after passing the SM through a parser, identify key tokens; link any that are potentially indefinite to stored, pre-existing patterns; and thereby use the four dimensions of location (those being the three spatial dimensions and the fourth of measured time) to interpolate, associate, and provide pattern and contextual knowledge to the otherwise-informal text message. Additionally, the SMS may use information outside of the text message to provide the right relative information for any potentially ambiguous mapping between the text message and the sender's world-view.

The rules of grammar determine the possible choices for any referent; by comparing the structure of the SMS to its context, a mapping is produced. The axial point is that the Sender of any message will be referenced in the first person, and the Recipient in the second person by default. However, if referenced in the third person, the rule of grammar dictate the linkage; so a sentence such as "Caesar desires . . . " tracks to the identifiers of Sender, Recipient, and then previous messages from each until a referent such as ownership or prior specific naming is located.

DESCRIPTION OF THE DRAWINGS (Solid lines indicate developments within an eElement; dashed lines indicate information and action being transmitted between elements.)

FIG. 1 is an example message cycle. The sender inputs a text message "I want U here" into his cellphone (substituting the $22^{nd}$ letter for the second person pronoun to save some keystrokes) and sends it [01]. The SMS [02] uses the method described in the parent invention to associate the contextual information such as the GPS location, and thus the physical address, of the Sender at the time the message was sent with that message. The recipient, on getting the message [03], is uncertain and queries about the two terms in the message she does not understand [04]. This return query is associated by the SMS central server with the preceding communication and identified as a clarification request. The SMS compares the ambiguities with both relevant associated context information, thereby associating 'here' with the GPS location [05], and thus the real-world address, of the Sender at the time the original message was sent; and identifying the shorthand 'U' from a previous message stored in a database of such [06] for the pronoun "you", linking that also to the Recipient in the original message. This clarification is then delivered to the Recipient without requiring intervention or action on the part of the Sender.

Figure 2:
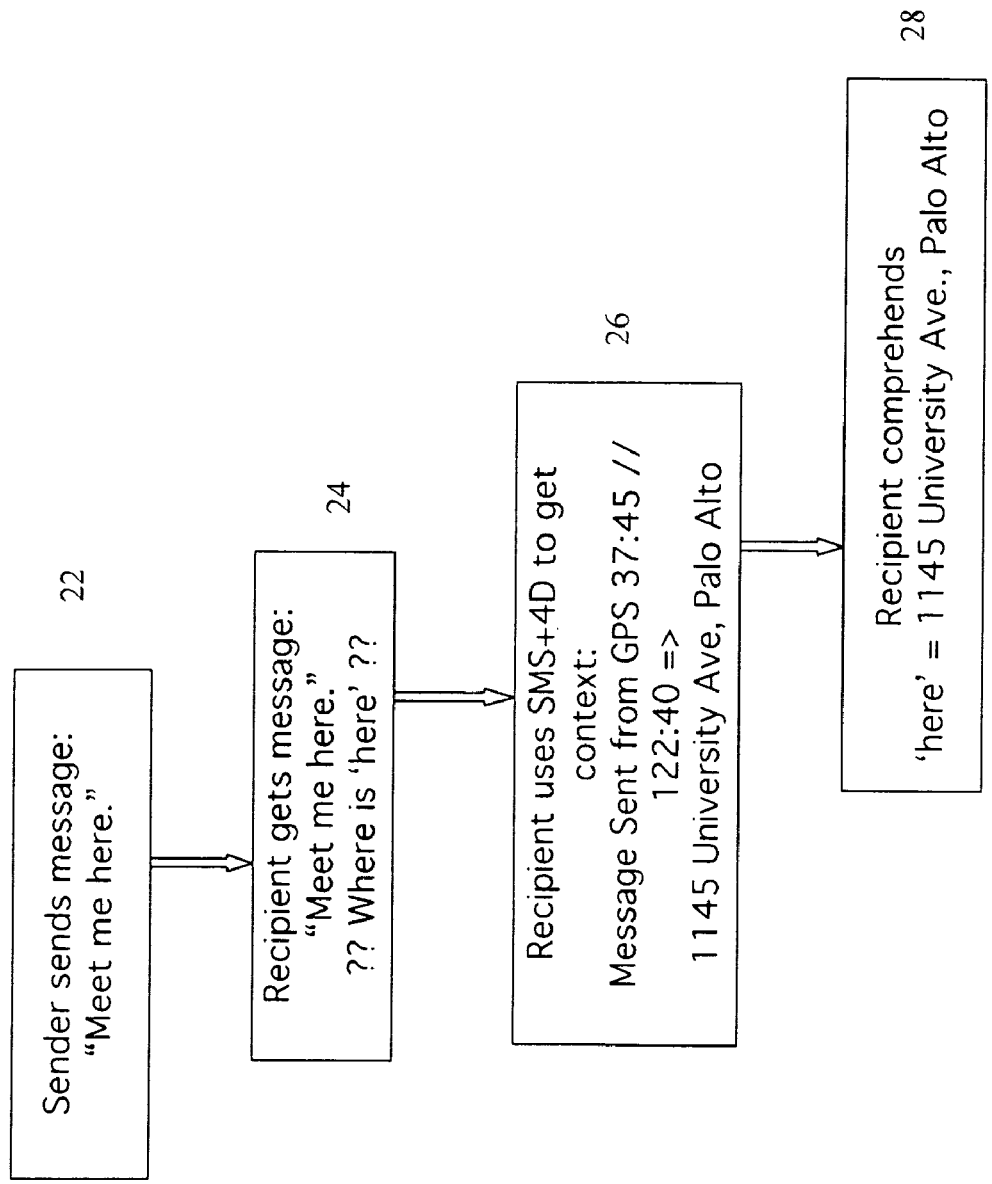

FIG. 2 is an example of the method taken as a series of steps over time. The Sender sends a message with a potentially ambiguous pronoun as to location [22]. The Recipient, on receiving the message and recognizing the uncertainty [24], next engages the SMS+4D to make explicit embedded contextual information [26], thereby enabling the identification that renders the ambiguity into an identified certainty [28].

DETAILED DESCRIPTION

A Short Message Service (SMS) provides and supports communication linking its users. In every message, the Core Text thereof is only a part of the communication, though it is the element most commonly thought to comprise the communication. For example, the short phrase "I want U here" has those four words as its Core Text. That communication communicates the existence of a need, the existence of an individual referenced by the proper pronoun "I", the coded reference to and thus existence of a second individual referenced by the non-word token "U" (and the two individuals are presumed, in the absence of a mirror and a solipsistic utterance, to be distinct), and a location for the first person. In a multi-media communication, an accompanying sound and visual image(s) of a communication's Core Text may greatly transform the meaning of the message, emphasizing or even inverting the meaning.

Contextual information associated with each message (its sender, recipient(s), time, and format) is another, equally important part of the communication; and is described in the parent invention.

The rules of grammar are used to link prepositional referents to the context (including the identities of the Sender and Recipient(s)) of the SMS, while the time-stamp for a message provides the 4-D contextual linkage that helps a pattern amongst several messages sent over time. If messages overlap then the greatest common denominator of time and meaning is used, acknowledging that no new referent can be guaranteed to be shared in meaning until at least some exchange of information occurs, with the exception of referents that are either fungible, generic, or from a shared cultural background.

Finally, interpersonal, synchronous communication uses what can be described as "sideband" signaling through vocalization variations (tone, volume, pitch, and timing) and visual accompaniment (expression, gesture, and/or body language) to provide additional contextual meaning to the formal verbalization.

Until now, most Short Message Services concerned themselves with transmitting only the first-mentioned part of a communication—the Core Text. A significant part of human communication need is for correction of insufficiently-differentiated Core Text that failed to incorporate associated context that was known to the Sender and had been intended to be made known to the Recipient—but was omitted or forgotten. These associations can depend upon the indeterminacy of terms in the language, a lack of or indeterminacy in the terms of any short-hand coding used by the Sender, or the three dimensions of space and fourth dimension of time providing the Sender's context at the instant the message was sent, that the Recipient must know to correctly map references made by the Sender to the reality which the Sender was experiencing at that specific time.

There is a value to a Short Message Service which can, at a Recipient's request, provide and make explicit as much of such contextual and associational information as the Recipient requires to correctly interpret the Sender's Core Text, in order to enable the Recipient to comprehend the meaning of a single Short Message without requiring further intercommunication—in other words, a SMS that additionally assists and supports human-centered encoding. This invention describes a method for providing through a SMS such doubly-additional, four-dimensional support.

Overview

The typical desired use of any SMS is an exchange between already-associated individuals of a meaningful short message (SM) from a Sender that can be correctly interpreted by an intended Recipient. These messages are generally not just informal, but further use a slang common to the sender and recipient. Isolated from its context (e.g. without any knowledge of sender, recipient, time of message, or associational context), many a SM would be incomprehensible to a third party. This semantic isolation is viewed as a feature, not a bug, by many of the sub-communities (particularly teenagers) who are the heaviest SMS users.

SM's often incorporate informal, shared-culture-based, coding schemes that human users develop for a number of reasons, including but not limited to the functional limitations facing the SMS's users. These functional limitations can be from the transmission hardware (e.g. the limited, 12-key keyset of a handset); or from the handicap of a limited shared vocabulary (e.g. cross-language, or even cross-specialty-boundary communications through a shared 'pidgin' or phrase-set); or from a task-imposed constraint (e.g. a need for immediate interaction without the luxury of an indefinite time to perfect all miscommunications). Or they may be imposed by the users seeking to deliberately enhance separateness between the small group sharing a coding scheme and the rest of the world of possible users (e.g. police 'operational codes'; businessmens' transactional codes; and some would argue, patent prosecutors', or even all lawyers', specialized versions of English). The hazard with any coding scheme—particularly any informal or naturally-evolved one, is the ease of misinterpretation. The hazard of any informal language is the absence of protection that is given by formal language schema. Precision generally (but not uniformly) increases with formality of language; though, of course, there are times when a spontaneous informality communicates more accurately a human meaning than the most precisionist of formal address.

Any asynchronous communication short message system (be it an exchange of letters, chalked signs, or emails) that is best and most often used with messages of limited, indeed 'collapsed' length—when compared against the extents of formal messages containing the same information—necessarily balances 'ease of use' to encode and send any specific message, against the 'need for precision'. One that specifically uses the relative strength of recognition memory against spontaneous memory (the capability to identify a 'right' association when presented with a list, as opposed to the capability of generating a right association without any cue), better serves human usage.

In the simplest enhancement, the SMS+4D enables the Recipient of a SMS with a non-understood referent to mark that referent as 'not understood' and return that new message to the Sender.

Increasingly, as SMS incorporates more than text capability, it allows the association of additional signals, using specific time-and-context linkages, to the Core Text, creating the opportunity to automatically provide contextual metadata explicitly to the Recipient. What SMS+4D provides is the asynchronous embodiment, over a gap in time, of the state-and-point capability of a synchronous, shared-location and shared-view conversation known as "say and point". With the difference that the Recipient, not the Sender, can elicit the linkage as the Recipient finds it needful to properly interpret the Core Text—and all without having to re-include the Sender in another loop of messaging for correction.

As one specific example, a Core Text message that stated "I want this" would, by itself, be incomprehensible. There is no identifiable antecedent, or linkage, between the indeterminate pronoun 'this' and any concrete, specific, meaning in the real world. Sometimes, true, it is possible to use the rules of formal grammar and a pre-existing, linked message to resolve the indeterminacy—as it would be for that situation where the preceding SMS between Sender and Recipient had been "You know Johnson's Porsche Carrerra?" (The complete syllogism would then become: "You know Johnson's Porsche Carrerra? I want this." leading to the conclusion 'this=Johnson's Porsche Carrerra'.)

At other times text alone is insufficient to provide definite meaning. Consider the previous example, with three distinct, but parallel, modifications—there are two known individuals, each named Johnson, each of whom (Johnson#1 and Johnson#2) owns a Porsche Carrerra; Johnson owns more than one Porsche Carrerra; and, the preceding message said "See that Porsche Carrerra?". The SMS+4D provides the necessary contextual cue and linkage that allows specific identification; whether that be a time/date/location/coordinating message stamp that puts the Sender with Johnson#2 when the message was sent, or an image of a specific Porsche Carrerra is associated with the messages' text. Whether the image is with 'that' from message #1, or with "this" from message #2, the context linkage is provided by the SMS+4D.

Prepositional and pronoun linkages can be mapped readily. "Here" is tied to the location of the Sender when the message is sent. "I", "me", "mine"; and "you", "you", and "yours", tie respectively to Sender and Recipient(s). "We" is a special case indicating that the Sender is grouped with others, but a second-level co-locational and co-durational test can clarify whether the rest of the group includes or excludes the Recipient. "We are here" is inclusive of Recipient if and only if both Sender and Recipient are in the same time at the same place, and is exclusive of Recipient otherwise.

There are also pronoun referents that are deliberately ambiguous out of context. Without something telling you what "it" is, you cannot know what I mean when I use the word "it". Other than the fact that the meaning of "it" is undetermined. The context can be provided either through separate but referenced SMS messages, or by an explicit attachment. If an SMS+4D message arrives with a image from a Sender's camera-phone, the content of the image is available to provide the linkage. Whatever is most prominent in the image will be mapped to the broadest indeterminate pronoun as the default. The SMS+4D message can be deconstructed for semantic meaning to more specifically examine the image and provide the correct mapping. If the SMS+4D refers to a 'red car' and the image shows only one car that is red, of the six in the image, then the mapping is unambiguous. The deconstructive linkage can be attained through linguistic semantic assignment methods commonly known in the prior art, as has been known since the early 1970's when Prof. Terry Winograd created the "SHRDLU" program. See, for example, means referenced in *Language As A Cognitive Process*, Terry Winograd, © 1983, Addison-Wesley, ISBN 0-201-08571-2; these include Word Patterns and Classes, Context-Free Grammars; Transformational Grammars; Augemented Transition Network Grammars; Feature and Function Grammars; and the summary of English syntax disclosed therein in Appendix B.

When an SMS+4D in isolation resists accurate linkage between an indeterminate term (a pronoun or other word without a determinable antecedent referent), the SMS then searches for linkages from prior exchanges between Sender and Recipient, first correcting for directionality, Recipient and Sender (swapping 'I', and 'you', among other changes, as needed). If the token is found in a prior message it is checked for a pre-existing linkage and that is used.

Finally, if no pre-existing linkage can be found then the word structure pattern and known specific tokens for the ambiguous SMS message are compared against all SMS messages retained in a database of prior messages that is used to establish meanings. Any messages that would create a contradictory, inconsistent meaning (e.g., confusing two individuals as one, two locations known to be distinct as identical, or two features known to be distinct as identical) for either the word structure pattern or a known specific token, are ignored. The SMS+4D server associates the known specific tokens and the word structure patterns from the stored messages, with the contextual information of the current SMS message, and finds the closest match possible. In a further enhancement of the invention, the SMS+4D server will, upon successfully identifying a current ambiguous SMS message with a word structure pattern and token associations, strengthen the weighting of association of that specific word structure pattern and the known specific token in a neural net used to process each ambiguous SMS message. In an alternative further enhancement of the invention, the SMS+4D server will, upon successfully identifying a current ambiguous SMS message with a word structure pattern and token associations, apply heuristic rules and record all strengthened associations. In yet a further, alternative enhancement of the invention, the SMS+4D server will, upon successfully identifying a current ambiguous SMS message with a word structure pattern and token associations, use a combination of strengthened association of that specific word structure pattern and the known specific token in a neural net used to process each ambiguous SMS message, and application of apply heuristic rules, to deepen its recorded comprehension of semantic meaning.

I claim:

1. A computer-implemented method of a Short Message Service (SMS) comprising:
   parsing a Short Message with a server;
   generating a Context Metadata of the Short Message by any set of the following:
   attaching a current Global Positioning System ('GPS') location of a Mobile Device as the Context Metadata;
   attaching a current timestamp as the Context Metadata;
   attaching an image as the Context Metadata;
   attaching a file as the Context Metadata;
   attaching a referent to a prior Short Message as the Context Metadata;
   explicitly associating the Context Metadata to the Short Message;
   wherein a Server includes a Cultural Database containing the prior Short Message including a token and a word structure pattern, and the step of processing the Short Message through the Server further comprises:
   comparing each indeterminate token in the Short Message against the tokens contained in the Cultural Database to find a match according to a specified threshold;
   comparing the word structure pattern of the Short Message against the word structure patterns contained in the Cultural Database to find the match according to the specified threshold; and,
   using the match according to a specified threshold of each indeterminate token and word structure pattern of the Short Message to establish a translation linkage between the Short Message and Context Metadata;
   incorporating into the Short Message a recoverable form of at least one of an explicit trace of a translation linkage, an ordered listing of alternative linkages, an association-strength measurement of the translation linkage between the Context Metadata and the Short Message and a query-for-accuracy value of a linkage; and
   incorporating to the Short Message in a recoverable form upon request, of at least one of the explicit trace of the translation linkage, an ordered listing of alternative linkages, the association-strength measurement of the translation linkage, and the query-for-accuracy value of the linkage.

2. A computer-implemented method of a Short Message Service (SMS) comprising:
   parsing a Short Message with a server;
   generating a Context Metadata of the Short Message by any set of the following:
   attaching a current Global Positioning System ('GPS') location of a Mobile Device as the Context Metadata;
   attaching a current timestamp as the Context Metadata;
   attaching an image as the Context Metadata;
   attaching a file as the Context Metadata;
   attaching a referent to a prior Short Message as the Context Metadata;
   explicitly associating the Context Metadata to the Short Message;
   wherein a Server includes a Cultural Database containing the prior Short Message including a token and a word structure pattern, and the step of processing the Short Message through the Server further comprises:
   comparing each indeterminate token in the Short Message against the tokens contained in the Cultural Database to find a match according to a specified threshold;
   comparing the word structure pattern of the Short Message against the word structure patterns contained in the Cultural Database to find the match according to the specified threshold; and,
   using the match according to a specified threshold of each indeterminate token and word structure pattern of the Short Message to establish a translation linkage between the Short Message and Context Metadata;
   having a user identify a part of the Short Message that is not understood by the user;
   applying a deconstructive linkage that is attained through a linguistic assignment method to the Short Message;
   using a mapping technique to connect the context metadata to the part of the Short Message that is not understood by the user;
   returning the Short Message with the mapped contextual metadata to the user; and,
   repeating the above steps on the user's request to perform an alternative mapping;
   correcting a directionality of any such prior message;

searching for any linkage between the Context Metadata and the part of the Short Message that is not understood by the user in a prior exchange; and, performing the mapping if a linkage is found in a prior message.

3. A computer-implemented method of a Short Message Service (SMS) comprising:

parsing a Short Message with a server;

generating a Context Metadata of the Short Message by any set of the following:

attaching a current Global Positioning System ('GPS') location of a Mobile Device as the Context Metadata;

attaching a current timestamp as the Context Metadata;

attaching an image as the Context Metadata;

attaching a file as the Context Metadata;

attaching a referent to a prior Short Message as the Context Metadata;

explicitly associating the Context Metadata to the Short Message;

wherein a Server includes a Cultural Database containing the prior Short Message including a token and a word structure pattern, and the step of processing the Short Message through the Server further comprises:

comparing each indeterminate token in the Short Message against the tokens contained in the Cultural Database to find a match according to a specified threshold;

comparing the word structure pattern of the Short Message against the word structure patterns contained in the Cultural Database to find the match according to the specified threshold; and, using the match according to a specified threshold of each indeterminate token and word structure pattern of the Short Message to establish a translation linkage between the Short Message and Context Metadata;

having a user identify a part of the Short Message that is not understood by the user;

applying a deconstructive linkage that is attained through a linguistic assignment method to the Short Message;

using a mapping technique to connect the context-metadata to the part of the Short Message that is not understood by the user;

returning the Short Message with the mapped contextual metadata to the user; and, repeating the above steps on the user's request to perform an alternative mapping;

correcting a directionality of a prior message;

searching for any linkage between the word structure pattern of the part of the Short Message that is not understood by the user and the word structure pattern used in a prior exchange; and, performing the mapping if a linkage is found in the prior message.

* * * * *

UNITED STATES PATENT AND TRADEMARK OFFICE
CERTIFICATE OF CORRECTION

PATENT NO. : 7,551,935 B2
APPLICATION NO. : 11/519600
DATED : June 23, 2009
INVENTOR(S) : Amit Karmarkar It is certified that error appears in the above-identified patent and that said Letters Patent is hereby corrected as shown below:

On the title page item (75), the Inventor's last name is misspelled as KARMAKAR instead of KARMARKAR (R is missing before K) at all places in the published and issued patent.

Signed and Sealed this

Eighth Day of September, 2009

David J. Kappos
*Director of the United States Patent and Trademark Office*